US005778335A

United States Patent [19]

Ubale et al.

[11] Patent Number: 5,778,335

[45] Date of Patent: Jul. 7, 1998

[54] METHOD AND APPARATUS FOR EFFICIENT MULTIBAND CELP WIDEBAND SPEECH AND MUSIC CODING AND DECODING

[75] Inventors: Anil Wamanrao Ubale; Allen Gersho, both of Goleta, Calif.

[73] Assignee: The Regents of the University of California, Oakland, Calif.

[21] Appl. No.: 605,509

[22] Filed: Feb. 26, 1996

[51] Int. Cl.$^6$ .............................. G10L 9/14; G10H 7/00; H04B 1/66

[52] U.S. Cl. .......................... 704/219; 704/223; 704/262; 704/264; 704/500

[58] Field of Search .................................. 395/2.28, 2.32, 395/2.71, 2.73, 2.91; 704/219, 223, 262, 264, 500

[56] References Cited

PUBLICATIONS

Anil Ubale and Allen Gersho, "A Multi-Band CELP Wideband Speech Coder," Proc. ICASSP 97, pp. 1367–1370, Apr. 1997.

Jean Laroche and Jean-Louis Meillier, "Multichannel Excitation/Filter Modeling of Percussive Sounds with Application to the Piano", IEEE Trans. on Speech and Audio Processing, vol. 2, No. 2, pp. 329–344, Apr. 1994.

Allen Gersho, "Advances in Speech and Audio Compression," Proc. IEEE, vol. 82, No. 6, pp. 900–918, Jun. 1994.

Peter Noll, "Digital Audio Coding for Visual Communications", Proc. IEEE, vol. 83, No. 6, pp. 925–943, Jun. 1995.

*Primary Examiner*—David R. Hudspeth
*Assistant Examiner*—Tālivaldis Ivars Šmits
*Attorney, Agent, or Firm*—Merchant, Gould, Smith, Edell, Welter & Schmidt

[57] ABSTRACT

A method of digitally compressing speech and music by use of multiple band ("multiband") fixed excitations stored in codebooks. The use of multiband fixed excitations, along with a coupling method for interconnecting the excitation codebooks and adaptive codebooks and for generating the composite excitation signal, improve the long-term and short-term prediction, and the use of voice-music classification allows the coding structure to be adapted to the statistical character of the audio signal.

7 Claims, 7 Drawing Sheets

METHOD AND APPARATUS FOR EFFICIENT MULTIBAND CELP WIDEBAND SPEECH AND MUSIC CODING AND DECODING

BACKGROUND OF THE INVENTION

1. Field of the Invention

This invention relates in general to the field of efficient coding (compression) of wideband speech, music, or other audio signals for transmission and storage, and the subsequent decoding to reproduce the original signals with high efficiency and fidelity, and more specifically, to the use of a multiple band Code-Excited Linear Prediction (CELP) approach to increase the coding efficiency and accuracy.

2. Description of Related Art

Conventional digital compression of speech is based on the narrowband of roughly 300 to 3300 Hertz due to limitations of the analog transmission over telephone systems. This limitation prevents the compressed and subsequently decompressed speech from fully reproducing the tonal qualities of common human speech.

Wideband speech allows an increased bandwidth of roughly 50 to 7000 Hertz thereby allowing a richer more natural and more intelligible audio signal that is closer to the tonal qualities of common human speech. Wideband speech compression will make the resulting decompressed speech signal output resemble the tonal quality of an AM radio sound, instead of the conventional compression techniques which generate decompressed sound signals having the usual quality of audio as heard during a telephone call.

A popular approach to wideband speech and/or music coding has been to tune a state-of-the art narrowband coder to wideband speech. Traditionally, wideband speech CELP coders belong to two classes: Fullband CELP, and Split-band CELP. The fullband CELP usually has higher complexity than split-band CELP, and suffers from an intermittent background hiss noise in the decoded speech.

The Split-band CELP is usually of lower complexity, but has extra delay for the Quadrature Mirror Filterbank, and suffers from bad quality in the frequency range where the filters for low and high band overlap. The present invention removes both these artifacts by using a novel idea of filtered excitation codebooks, fullband LPC synthesis, and error minimization over the original speech signal over the entire 8 kHz band.

A recent goal of an international standards body (the International Telecommunications Union, Telecommunications Standards Sector), has identified the objectives for a new international standard for efficient coding for 16 kbits/s, 24 kbits/s, and 32 kbits/s wideband speech coding.

It can be seen that there is a need for efficient digital compression of wideband speech or audio signals for digital transmission. It can also be seen that there is a need for digital storage of the audio signal with subsequent decompression and reproduction of the signal.

SUMMARY OF THE INVENTION

To minimize the limitations in the prior art described above, and to minimize other limitations that will become apparent upon reading and understanding the present specification, the present invention discloses a powerful and highly productive system and method for compressing and decompressing wideband speech and musical inputs.

The present invention solves the above-described problems by providing a low bit-rate (typically, 16 to 32 kbits/s) coding and decoding by using a multiple band approach that avoids many of the drawbacks of prior coders. Speech and music processed by the present invention are very high quality.

These results are obtained in the present invention by use of multiple band ("multiband") fixed excitation, and a coupling method for interconnecting the excitation codebooks and for generating the composite excitation signal, improved long-term and short-term prediction, and the use of voice-music classification to allow the coding structure to be adapted to the statistical character of the audio signal.

A system in accordance with the principles of the present invention comprises an encoder and a decoder. The encoder comprises a Linear Prediction Coefficient (LPC) Analyzer, a synthesis filter, weighting filters, a voice/music classifier, a multiband bank of codebooks, a coupling network, an adaptive codebook, and an error minimizer. These elements are coupled together to produce an output of the encoder that accurately reproduces human speech and music patterns.

The decoder comprises a multiband bank of codebooks, a coupling network, an adaptive codebook, a synthesis filter, and a postfilter.

One object of the present invention is to accurately encode wideband speech and/or music. Another object of the present invention is to accurately decode the encoded wideband speech and/or music. Another object of the present invention is to accurately reproduce the original speech and/or music after the encoding and decoding processes.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and system for encoding and decoding speech and music. The system and method employ a 38th order linear prediction model and multiple codebooks to more accurately define patterns of speech and reduce the complex speech to low bit rate patterns which are easily transmitted over data and telephone lines.

Figure 1:
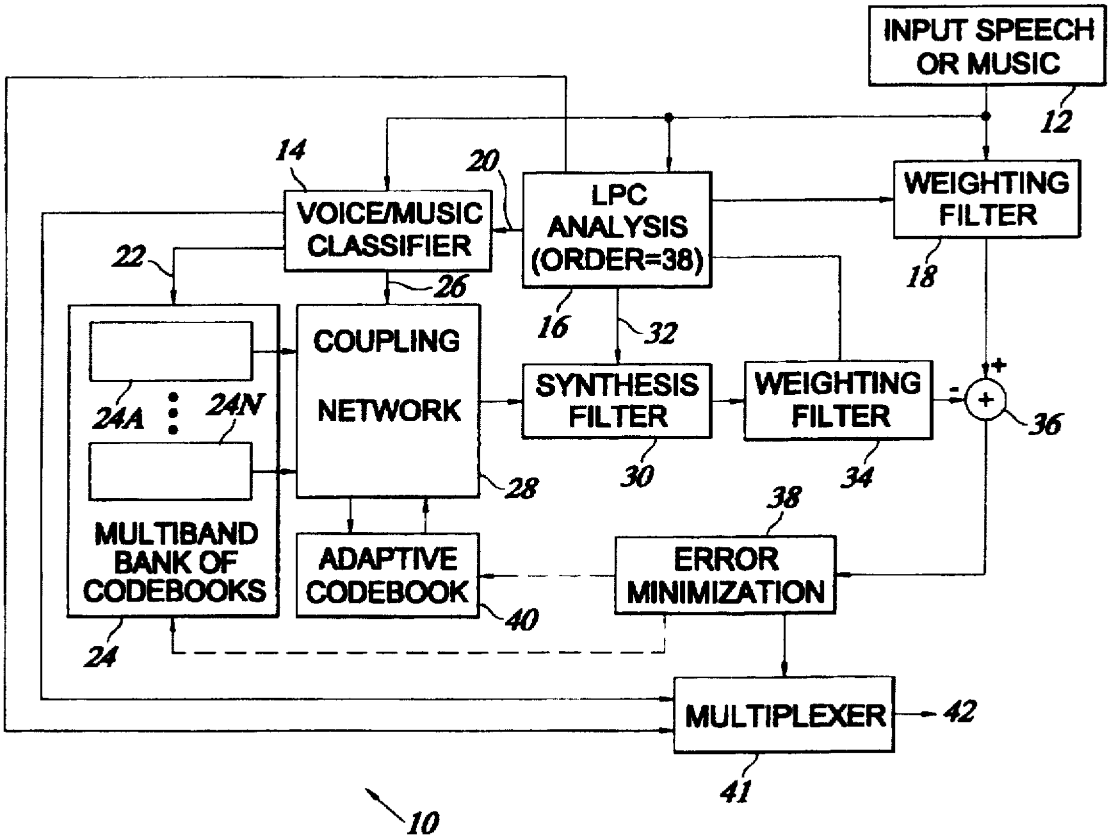
FIG. 1 shows the Multiband Code-Excited Linear Prediction (MBCELP) encoder in accordance with the present invention.

FIG. 1 shows the Multiband Code-Excited Linear Prediction (MBCELP) encoder 10 in accordance with the present invention. The MBCELP encoder 10 has an input 12 which can comprise speech and music. The input 10 is coupled to a voice/music classifier 14, a Linear Prediction Coefficient (LPC) analyzer 16, and a perceptual weighting filter 18. An output 20 of the LPC analyzer 16 is also coupled to an input of the voice/music classifier 14. The LPC analyzer 16 is also coupled to weighting filter 18 and weighting filter 34.

The first output 22 Voice/music classifier 14 is coupled to the multiband codebook bank 22 and the second output 26 of the voice/music classifier 14 is coupled to the coupling network 28. The output of the multiband codebook bank 24 is coupled to the coupling network 28. The output of the coupling network 28 is coupled to the input of the synthesis filter 30.

The output 32 of the LPC analyzer 16 is also coupled to the input of the synthesis filter 30. The synthesis filter 30 is coupled to the second weighting filter 34. A negative output of the second weighting filter 34 is coupled to a summing junction 36. The output of the perceptual weighting filter 18 is also coupled to the summing junction 36. The output of the summing junction 36 is coupled to the error minimizer 38.

The error minimizer 38 is coupled to the adaptive cookbook 40 and the multiband cookbook bank 24. Adaptive codebook 40 can be a single adaptive codebook 40 or a plurality of adaptive codebooks 40. A single adaptive codebook 40 is shown for simplicity. The coupling network 28 is also coupled to the adaptive cookbook 40. The inputs to the multiplexer 41 are coupled to outputs of the LPC Analyzer 16, the voice/music classifier 14, and the error minimizer 38. The output of the encoder 10 is the output bitstream 42.

LPC Analysis

The LPC analyzer 16 performs a short-term prediction on a speech frame of N samples. Each speech frame is divided into L subframes of M samples each (N=L*M), e.g. N=320, L=8, and M=40. LPC analysis is done using the autocorrelation method of analysis on a Hamming windowed input 12. To improve the LPC analyzer 16's short-term prediction performance for a music signal, the LPC order is chosen to be a high order. In the above example, with M=40, an LPC of order 38, is used.

The encoder 10 is based generally on the code-excited linear prediction (CELP) approach to speech coding. The sampling rate for the encoder 10 is 16 kHz. A 38th order linear prediction (LP) model is the basis for the LPC analyzer 16 with the following transfer function:

$$A_q(z) = 1 + \sum_{i=1}^{38} a_q(i) z^{-i}$$

where $a_q(i)$, i=1, . . . 38 are the quantized linear prediction parameters.

The perceptual weighting filter used in the analysis-by-synthesis search is given by, $$W(z)=A(z/\gamma_1)/A(z/\gamma_2)$$

where A(z) is the transfer function of prediction error filter with unquantized interpolated LPC parameters obtained from the LPC Analyzer 16, where $\gamma_1$ and $\gamma_2$ are the weighting factors.

The coder uses 20 ms speech frames. The short-term prediction parameters are transmitted every frame. The speech frame is divided into 8 subframes of 2.5 ms (40 samples). The pitch and the excitation codebook parameters are transmitted every subframe. The LPC analyzer 16 parameters are quantized with 63 bits in the line-spectral-frequency (LSF) domain for the 24 kbps version, and with 55 bits in the LSF domain for the 16 kbps version.

The pitch lag portion of the LPF analyzer 16 is encoded with 8 bits for each subframe in the 24 and 32 kbps versions. In the 16 kbps version, it is coded with 8 bits in the odd numbered subframes, and with 5 bits in the even numbered subframes. The pitch gains are encoded using 5 bits for every subframe for both versions.

The multiband codebook bank 24 parameters are encoded every subframe. The number of bits used to code these parameters are switched between the two sets, according to the output of the voice/music classifier 14 block.

The voice/music classifier 14 operates on every frame of input 12 speech or music and makes use of stored past history information. The voice/music classifier 14 makes the decision based on the short-term and long term characteristics of the input signal and on the prior classification decisions. The classifier identifies the character of the signal as one of two types, one being more typical of most types of music and the other more typical of normal human speech. The voice-music classifier 14 influences the multiband excitation generation technique and is transmitted with 1 bit to the decoder 44 in each frame.

Short-term Prediction

Short-term prediction, also called linear prediction (LP), analysis is performed once per input frame using the autocorrelation method with a 20 ms Hamming window. A lookahead of 8.75 ms is used in the LP analysis. The autocorrelations of the windowed speech are computed and a 60 Hz bandwidth expansion is used by lag windowing the autocorrelations.

The LP coefficients of the LPC analyzer 16 are quantized using 63 or 55 bits for 24 or 16 kbps versions respectively. They are used in the 8th subframe, while the LP coefficients for the other subframes are obtained using interpolation. The interpolation is done in the LSF domain. The bit allocations for each frame are shown in Table 1.

| | Parameter | |
|---|---|---|
| | Bits per Frame 16 Kbps codec | Bits per Frame 24 kbps codec |
| LSFs | 55 | 64 |
| Voice/Music Classifier | 1 | 1 |
| Subframe Parameters | 264 | 416 |
| Total | 320 | 480 |

Table 1. MBCELP Bit Allocations

Quantization of LP Parameters

The LP parameters are computed every frame and converted to LSFs. They are quantized using multi-stage vector quantization. 16 stages for 24 kbps and 32 kbps versions are used with 15 stages of 4 bits each, and 3 bits for the last stage. 14 stages for the 16 kbps version is used with 13 stages of 4 bits each and last stage of 3 bits.

The distortion measure employed for the multi-stage vector quantization is the Weighted-Mean-Square-Error (WMSE). The weights are inversely proportional to the distance between neighboring LSF's and are given by:

$$w_1 = 1.0 \quad \text{if } w_2 - 0.04\pi - 1 > 0$$
$$= 12(w_2 - 0.04\pi - 1)^2 + 1 \quad \text{otherwise}$$
$$w_i = 1.0 \quad \text{if } w_{i+1} - w_{i-1} - 1 > 0$$
$$= 12(w_{i+1} - w_{i-1} - 1)^2 + 1 \quad \text{otherwise}$$

for $2 \leqq i \leqq 37$, and $$w_{38} = 1.0 \quad \text{if } -w_{37} + 0.92\pi - 1 > 0$$
$$= 12(w_{37} + 0.92\pi - 1)^2 + 1 \quad \text{otherwise}$$

The multi-stage vector quantization scheme uses a multiple-survivor method for an effective trade-off between complexity and performance. Four residual survivors are retained from each stage and are tested by the next stage. The final quantization decision is made at the last stage, and a backward search is conducted to determine the entries in all stages. The multi-stage vector quantization is design by a joint optimization procedure, rather than the simpler, but poorer, sequential search design approach.

The use of a high order LPC Analyzer 16 is unusual in conventional CELP coders. The use of such a high order LPC analyzer 16 results in improved quality of reconstructed music and speech. The LPC parameters are converted into Line Spectral Pair (LSP) parameters, interpolated, and quantized in the LSP domain. Although LPC parameters are computed once every frame, the interpolated LSP parameters are used for each subframe.

Voice-Music Classifier

It has been observed that the CELP structure is not particularly suitable for coding of music, particularly when pitch (or long-term) prediction techniques are used. The long-term prediction seldom gives any performance gain for music input, although it is a vital part for the speech or voice input. To improve quality of reproduced music, the adaptive codebook 40 is selectively disabled.

Once the LPC analyzer 16 has performed the analysis on the input 12, the voice-music classifier 14 of the present invention uses an open-loop pitch prediction gain computed from the input signal for one frame as one of the primary features to determine whether the input 12 is music or speech. If this open-loop pitch prediction gain is greater than a threshold, the frame is decided as voice. If the gain is smaller than the threshold, the input signal frame contains either music or unvoiced speech.

In the present invention, secondary features of the input 12, such as energy and short-term prediction gain, are tested by the voice/music classifier 14. If the input energy is higher than a threshold, the input 12 is likely to be music, and not unvoiced speech, so this frame of input 12 is decided as music by the voice/music classifier 14. If the energy of the input 12 is below the threshold, the short-term prediction gain is tested by the voice/music classifier 14. This gain is low for unvoiced speech, since the spectral flatness of the input signal is high, but the gain is higher than the threshold for music. Thus using these features, the input 12 is classified as voice or music by the voice/music classifier 14.

This classification is further made reliable, by switching from speech to music, and vice versa only after observing consecutive past decisions in favor of such a transition. More generally we can define a variety of ways of using the past history of individual preliminary frame decisions before making a final decision for the current frame.

A multilayer neural network can also be trained and implemented as the voice/music classifier 14 to make the decision from a set of input features from each of a sequence of frames of audio for which the correct voice/music character (from human listening) is used in the training procedure.

Perceptual Weighting Filter

The perceptual weighting filter 18 and second weighting filter 34 are the same as those used in conventional CELP coders with a transfer function of the form $$W(z)=A(z/\gamma_1)/A(z/\gamma_2)$$

where A(z) is the transfer function of prediction error filter with unquantized interpolated LPC parameters obtained from the LPC Analyzer 16, and $\gamma_1$ and $\gamma_2$ are the weighting factors.

Adaptive Codebook Excitation

The long-term prediction is advantageously implemented using one or more adaptive codebooks 40. Each adaptive codebook 40 covers the pitch lags which cover the human pitch range (50–400 Hz) i.e. approximately lags from 40 to 296, and is coded using 8 bits. There can be more than one adaptive codebook 40 in the MBCELP encoder 10. The use of more than one adaptive codebook 40 results in better speech and music quality.

Coupling Network

The coupling network 28 connects the multiband codebook bank 24 to the synthesis filter 30 according to the bitrate. The number of codebooks in multiband codebook bank 24, and the frequency range associated with each codebook 24A through 24N can be different for inputs 12 that are either voice or music. The particular configuration of selected codebooks is determined according to the voice/music classifier 26.

This use of the coupling network 24 and the different number of codebooks 24A through 24N in multiband codebook bank 24 effectively disables the pitch prediction whenever it is not useful, and a richer stochastic excitation is used. This further enhances the performance of the encoder 10 of the present invention for an input 12 that is comprised of music.

Error Minimization

The error minimizer 38 performs a search through each adaptive codebook 40 to find the pitch and gain for each band adaptive codebook 40 to minimize the error for the current subframe between the weighted input speech or audio signal and the synthesized speech emerging from the weighting filter 34. The summer 36 forms the difference of these two signals and the error minimizer 38 computes the energy of the error for this subframe for each candidate entry in the adaptive codebook 40. When the best entry and associated gain is found for each adaptive codebook 40, then the error minimizer 38 conducts a search through each codebook 24A through 24N in the multiband codebook bank 24 to find the best entries in the multiband codebook bank 24 for each band. Each entry is chosen to minimize the energy over the current subframe of the error signal emerging from summer 36.

Once the codebook entries and gains in the multiband codebook bank 40 and the adaptive codebook 40 have been determined, the error minimizer 38 sends binary data to the receiver for each subframe specifying the selected codebook entries and quantized gain values. In the case of the adaptive codebooks 40, the entries are specified by sending a pitch value for each adaptive codebook 40. In addition, bits specifying the quantized LPC parameters and one bit specifying the voice/music classification are also sent to the decoder 44 once per frame.

The multiplexer 41 formats the outputs of the LPC analyzer 16, the voice/music classifier 14, and the error minimizer 38 into a serial bitstream which becomes the output bitstream 42.

Figure 2:
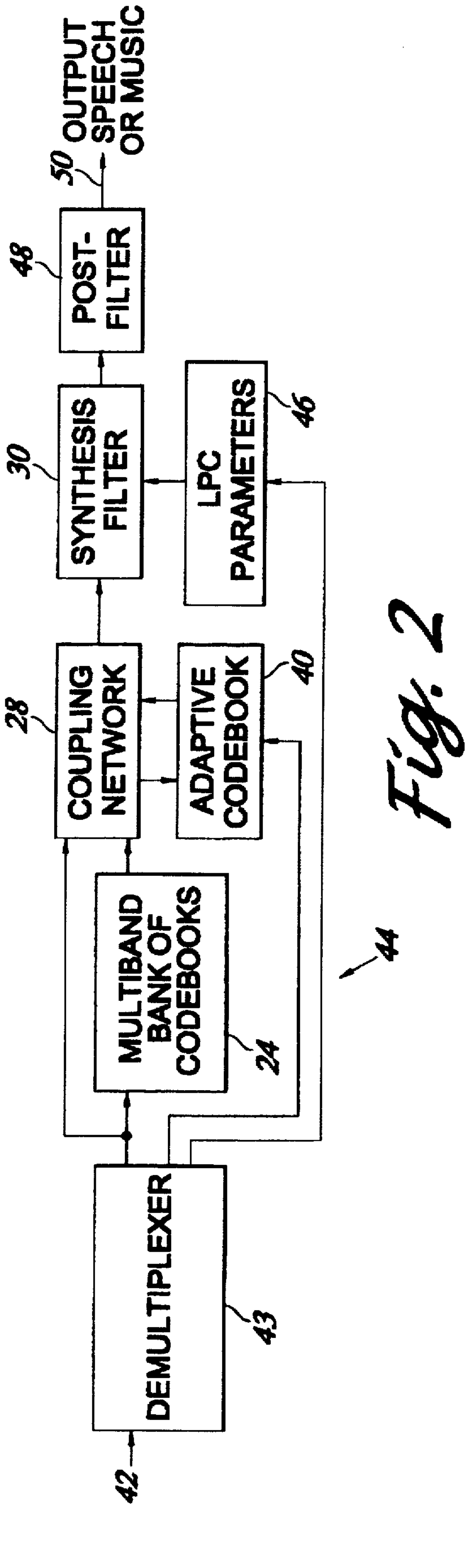
FIG. 2 shows the MBCELP decoder in accordance with the present invention.

FIG. 2 shows the MBCELP decoder in accordance with the present invention. The output bitstream 42 of encoder 10 is input to demultiplexer 43 of decoder 44. The output of demultiplexer 43 is directed to the input of the multiband codebook bank 24, the LPC parameters 46, and the adaptive codebook 40. The output bitstream 42 of encoder 10 is also directed to the coupling network 28 and to the LPC Parameters 46. The coupling network 28 is coupled to the adaptive codebook 40. The coupling network 28 is also coupled to the synthesis filter 30. The LPC parameters 46 are used as control parameters for the synthesis filter 30. The output of the synthesis filter 30 is passed on to postfilter 48. The output 50 of postfilter 48 is the reconstituted speech or music input 12 to encoder 10.

The decoder 44 operates by applying the output bitstream 42 from the encoder 10 to select the entries in the multiband codebook bank 24 and coupling those entries selected to the coupling network 28. The decoder 44 operates by first extracting from the bitstream 42 the bits needed to identify the various parameters and selected codebook entries. The quantized LPC parameters 46 are extracted once per frame and interpolated for use by the synthesis filter 30, the postfilter 48, and, if implemented, by the adaptive bit allocation module 52. The voice/music classification bit is then used to identify the correct configuration of codebooks. The adaptive codebook 40 entries and the multiband codebook bank 24 entries and associated quantized gains are then determined for each subframe and the overall excitation is generated for each subframe and then applied to the synthesis filter 30 and postfilter 48.

The decoder 44 decodes the parameters from the output bitstream 42 of the encoder 10, namely LP parameters, voice-music flag, pitch delay and gain for each adaptive codebook 40, multiband codebook bank 24 indices, and codebook gains. The voice-music flag is validated and then applied to the regeneration of the composite excitation from the decoded parameters and stored fixed codebooks in multiband codebook bank 24. The synthesis filter 30 produces the synthesized audio signal.

Adaptive Postfiltering

The reproduced signal quality is further enhanced by using an adaptive postfilter 48.

Typically the postfilter 48 consists of a spectral tilt compensation filter, a short-term postfilter and a long-term postfilter. Some parameters of the postfilter 48 can be determined by the LPC parameters for the particular frame. The long-term postfilter parameters are obtained by performing pitch analysis on the output signal of the synthesis filter 30. Other parameters of the postfilter 48 are fixed constants.

The voice/music classifier 14 can also be used to select the parameters of the postfilter 48 by storing two sets of fixed parameters, one for music and one for voice. In one particular configuration, the long-term postfilter portion of the postfilter 48 can be omitted completely if the class is music, in which case only the short-term postfilter and spectral tilt compensation filter portions of the postfilter 48 are used for the postfiltering operation.

Figure 3:
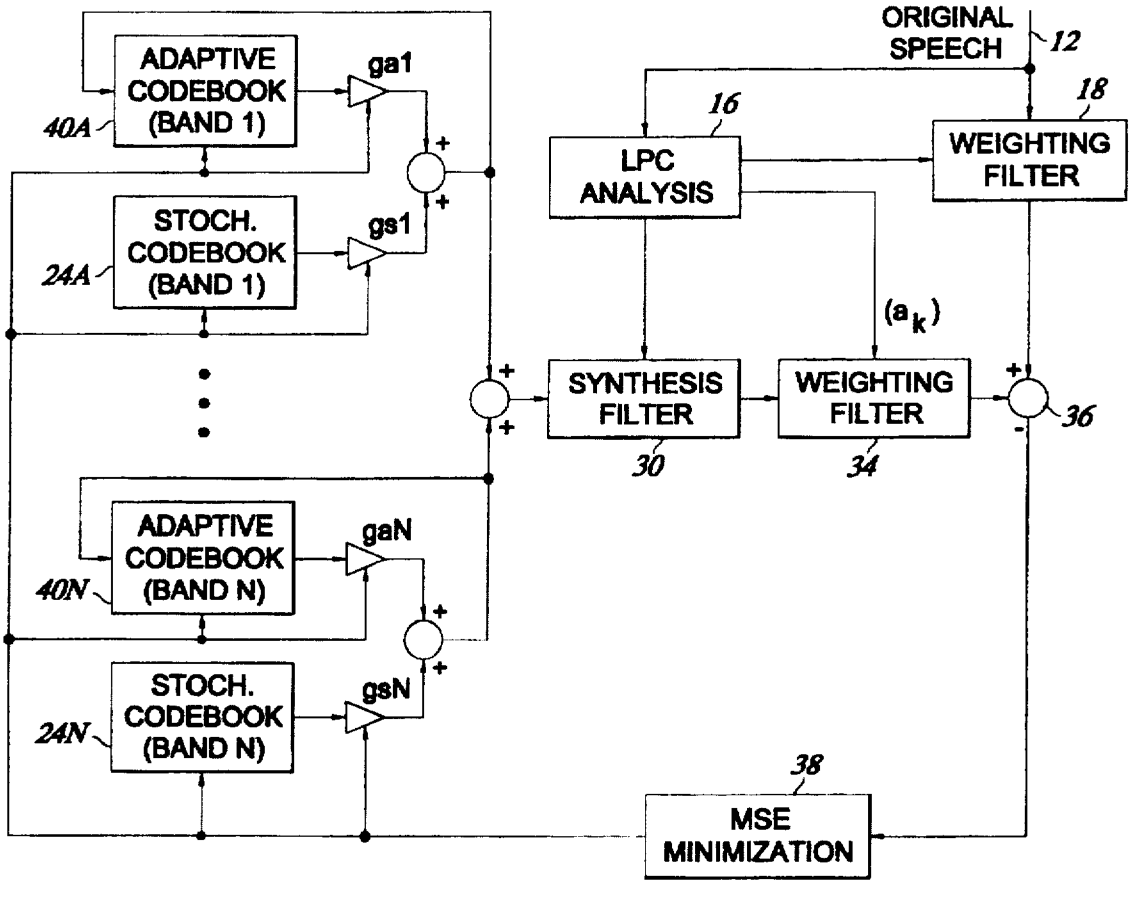
FIG. 3 shows the MBCELP for speech with adaptive codebooks for each band.

FIG. 3 shows the MBCELP for speech with adaptive codebooks for each band. The multiband codebook bank 24 is shown as several individual codebooks, one for each band. The codebook for the first band is first codebook 24A, the second would be second codebook 24B, etc. For simplicity, only the first codebook 24A and the last codebook, nth codebook 24N are shown on FIG. 3.

Similarly, adaptive codebook 40 is broken up into separate codebooks, one for each band. For simplicity, only first adaptive codebook 40A and nth adaptive codebook 40N are shown on FIG. 3.

Multiband Fixed Codebook Excitation

To obtain the entries for first codebook 24A, random codebooks are filtered off-line by appropriate filters to obtain entries that represent segments of excitation signals largely confined to a particular frequency band that is a subinterval of the entire audio band. This particular band is then assigned to first codebook 24A. Similar divisions of the frequency spectrum will generate entries for all codebooks including nth codebook 24N.

The entries of any codebook in multiband codebook bank 24 or adaptive codebook 40 will then have a frequency spectrum that is largely restricted in a particular frequency range. The entries are typically obtained by filtering the random codebook vectors through quadrature mirror filters (QMF) that divide the entire frequency spectrum of interest into n segments, n being the number of codebooks to be generated. The advantage of using the filtered entries to fill the codebooks in multiband codebook bank 24 and adaptive codebook 40 is that the quantization noise due to each discrete excitation codebook is localized in the frequency range of that codebook. This noise can be reduced by using a dynamic codebook size allocation for different bands. The dynamic codebook size allocation is based on the perceptual importance of the signals in different bands, and can be derived by using psychoacoustic properties.

The final excitation signal applied as the input to the synthesis filter 30 consists of a sum of subband excitation signals. For each subframe, each subband excitation signal is the sum of a gain scaled entry from a fixed, or "stochastic" codebook located in the multiband codebook bank 24 for that band and a gain scaled entry from the adaptive codebook 40 for that band. Each entry, sometimes called a "codevector," for the adaptive codebook 40 for a particular band consists of a segment of one subframe duration of the subband excitation signal previously generated for that band and identified by a time lag or "pitch" value which specifies from how far into the past of the subband excitation signal this entry is extracted.

This method of generating first adaptive codebook 40A through nth adaptive codebook 40N gives the benefit of a long-term predictor for each band. This is very advantageous when the pitch harmonics are not equally spaced across the wideband speech spectrum. This method also results in a better reproduced speech quality. The method is also helpful in encoding music that has a lot of tonality (strong sinusoidal components at a discrete set of frequencies).

Figure 4:
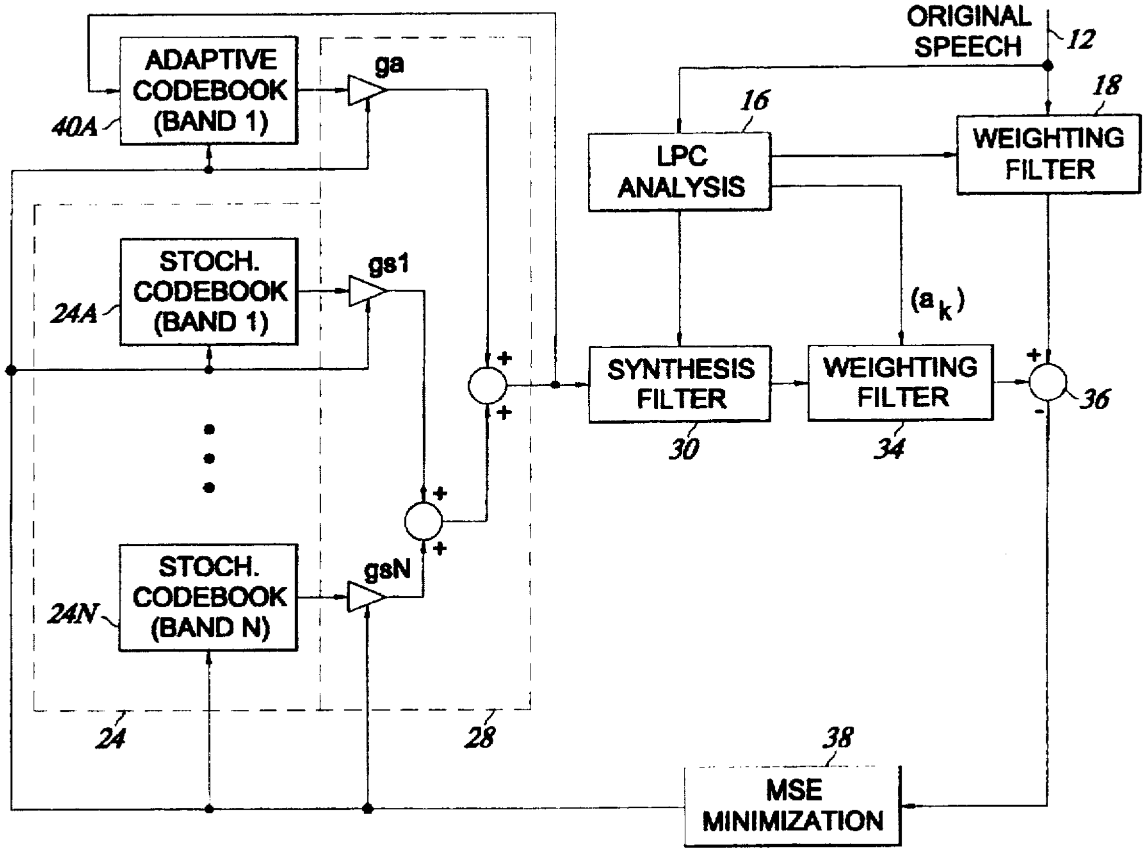
FIG. 4 shows the MBCELP for speech with a single adaptive codebook for all bands.

FIG. 4 shows the MBCELP for speech with a single common adaptive codebook for all bands. At low bit rates (16 kbits/s) there may not be enough bits to justify a separate adaptive codebook 40 for each band, compromising first adaptive codebook 40A through nth adaptive codebook 40N. In that case, a single adaptive codebook 40 can be used.

Figure 5:
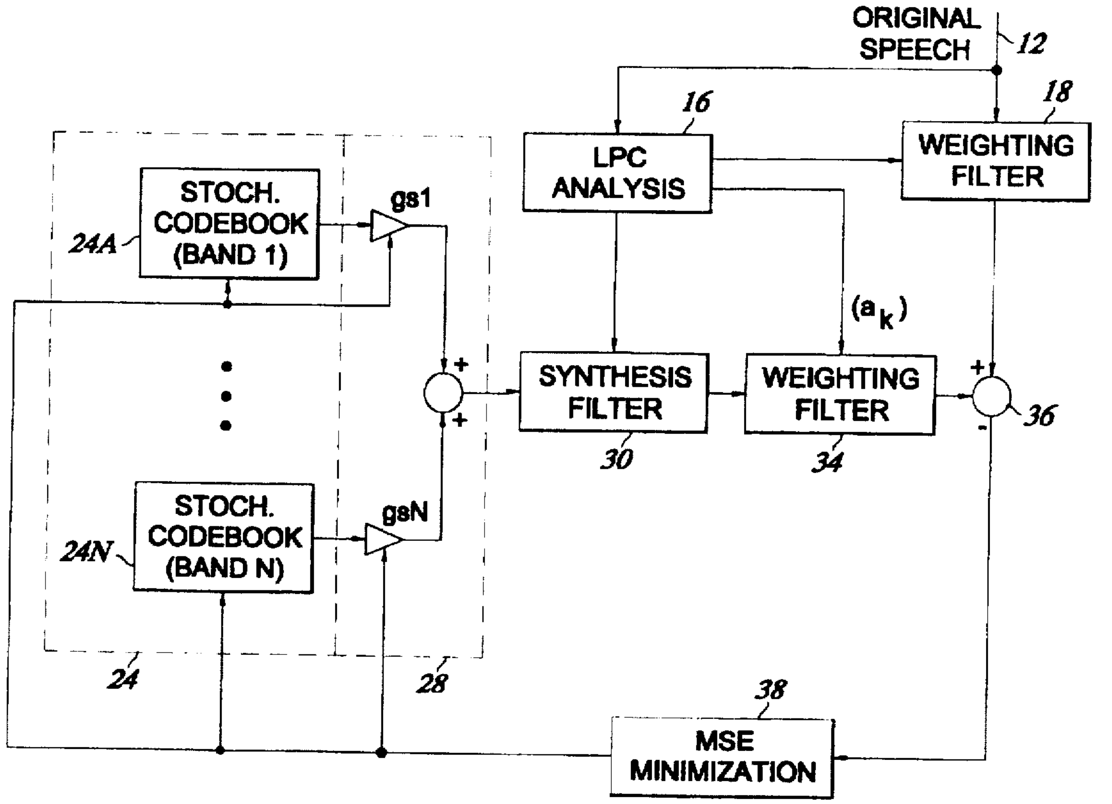
FIG. 5 shows the MBCELP for music with no adaptive codebook.

FIG. 5. shows the MBCELP for music with no adaptive codebook. This method deletes the adaptive codebook 40 and utilizes multiband codebook bank 24 as the only codebook for the encoder 10 and decoder 44.

Figure 6:
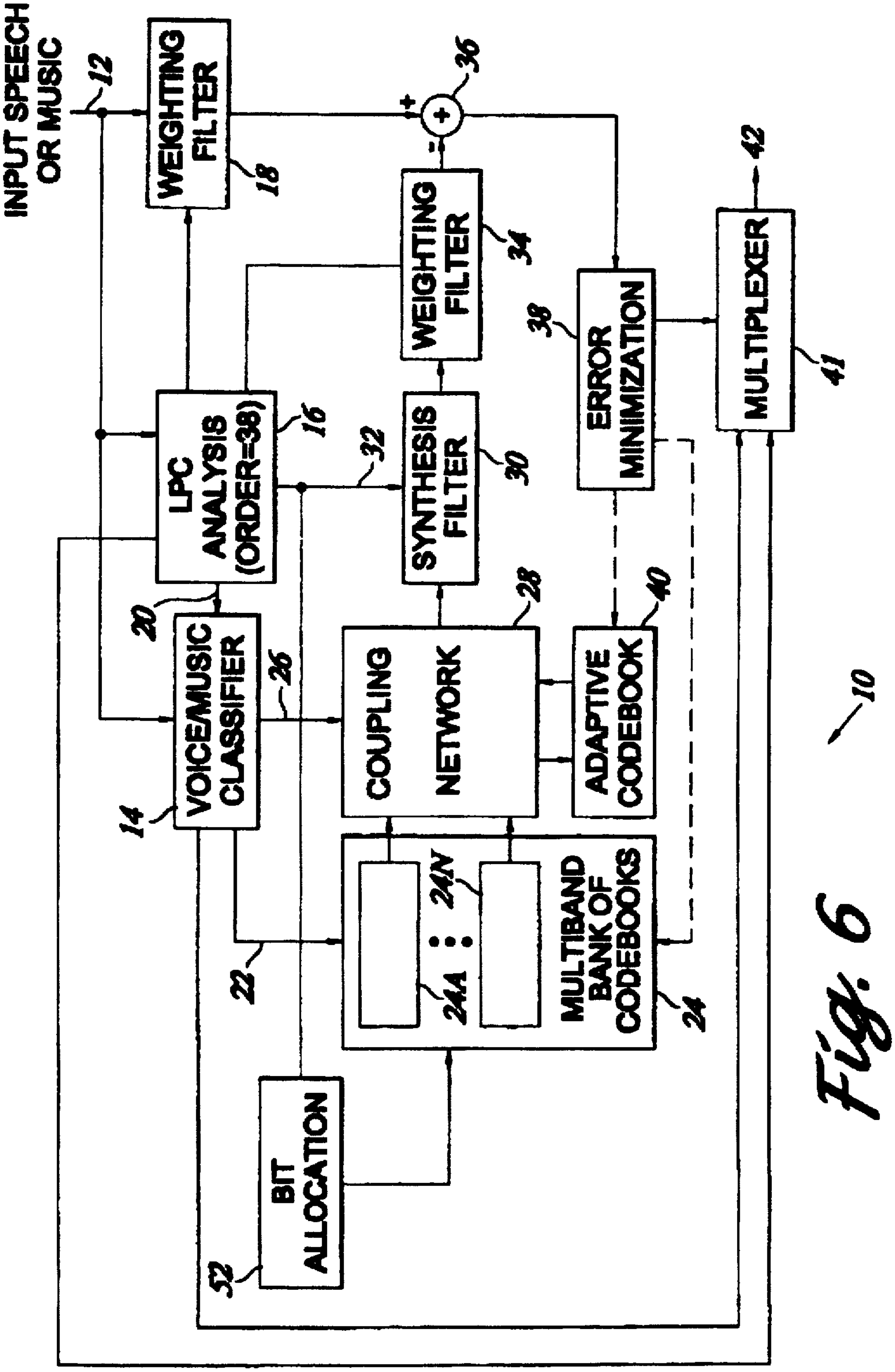
FIG. 6 shows the MBCELP encoder with additional codebook selection techniques.

FIG. 6 shows the MBCELP encoder with additional codebook selection techniques. Additional techniques, such as adapting the output 32 of the LPC analyzer 16 to further control the multiband codebook bank 24. This technique is called Adaptive Bit Allocation or Dynamic Codebook Size Allocation.

Adaptive Bit Allocation

The optional adaptive bit allocation 52 offers a method of obtaining improved perceptual quality by employing noise-masking techniques based on known characteristics of the human auditory system.

Depending on the character of the individual frame of the input 12, certain frequency bands may be perceptually more important to represent more accurately than other bands.

The LPC analyzer 16 provides information about the distribution of spectral energy and this can then be used by the encoder 10 to select one of a finite set of bit allocations in bit allocation 52 for the individual stochastic (fixed) codebooks.

For example, in a 2 band configuration and a given frame, the first band has a first codebook 24A with 1024 entries, and the last band, will have an nth codebook 24N with 1024 entries. An allocation of 6 bits for the high band and 8 bits for the low band would require that only the first 64 entries be searched for the high band and the first 512 entries be searched for the low band.

The decoder 44 on receiving the LPC information from the LPC analyzer 16 would determine which bit allocation was used in the bit allocation 52 and correctly decode the bits received from the encoder 10 describing the selected excitation vectors from the low and high bands.

Figure 7:
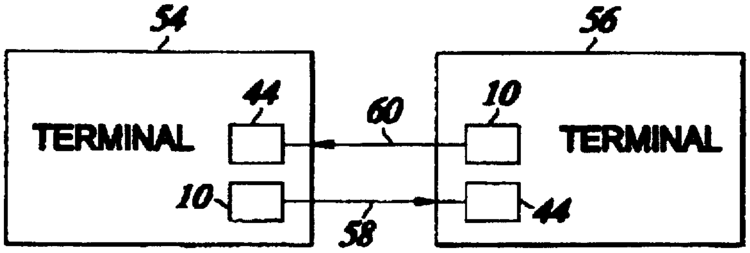
FIG. 7 shows the encoding and decoding technique of the present invention.

FIG. 7 shows the encoding and decoding technique of the present invention. The terminal 54 is coupled to second terminal 56 by data line 58 and second data line 60. The terminal 54 and second terminal 56 can be a computer, telephone, or video receiver/transmitter. This configuration is illustrative of the present invention, since an encoder 10 will be resident in terminal 54 and a decoder 44 will be resident in second terminal 56 connected by data line 58, and a second encoder 10 will be resident in second terminal 56 and a corresponding second decoder 44 will be resident in terminal 54 connected by second data line 60. The encoders 10 and decoders 44 can also be connected by a single data line 58.

Specific applications of this configuration for the present invention are integrated services digital network (ISDN) telephone sets; audio for videoteleconferencing terminals or for personal computer based real time video communications; multimedia audio for CD-ROMs; and audio for voice and music over a network, such as the Internet, both for real-time two way communication or one way talk radio or downloading of audio files for later listening.

Further, the present invention can be used for audio on telephone systems that have built-in modems to allow wideband voice and music transmission over telephone lines; voice storage for "talking books;" readers for the blind without the use of moving parts, such as a tape recorder, talking toys based on a playback from digital storage on a ROM; a portable handheld tapeless voice memo recorder, digital cellular telephone handsets, PCS wireless network services, and video/audio terminals.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for encoding and decoding sound, comprising the steps of:
- analyzing an input waveform and computing the linear prediction coefficients for a portion of the input waveform;
- classifying the input waveform as one of a group comprising speech and music;
- generating a first plurality of codebooks, each having an output, where each codebook is associated with a frequency band;
- generating at least one first adaptive codebook having an output;
- coupling the output of the first plurality of codebooks and the output of the at least one first adaptive codebook together to create a composite waveform;
- synthesis filtering the composite waveform;
- perceptually weighting the input waveform;
- perceptually weighting the synthesis filtered composite waveform;
- differencing the perceptually weighted synthesis filtered composite waveform from the perceptually weighted input waveform to form an output waveform;
- searching through the first plurality of codebooks and the adaptive codebook to minimize the errors in the output waveform; and
- decoding the output waveform using a second plurality of codebooks and at least one second adaptive codebook.

2. The method of claim 1, further comprising the step of masking an output quantization noise from the output of the first plurality of codebooks.

3. The method of claim 1, further comprising the step of post-filtering the decoded output waveform.

4. A system to encode and decode sound, comprising:
- an analyzer to compute linear prediction coefficients for a portion of an input waveform;
- a classifier for classifying the input waveform as one of a group comprising speech, speech and music, and music;
- a first plurality of codebooks, each having an output, where each codebook is associated with a frequency band;
- at least one first adaptive codebook having an output;
- a first coupler to couple the output of the first plurality of codebooks and the output of the at least one first adaptive codebook together to create a composite waveform;
- a synthesis filter for filtering the composite waveform;
- a first perceptual weighting filter for filtering the input waveform;
- a second perceptual weighting filter for filtering the synthesis filtered composite waveform;
- a signal combiner for differencing the perceptually weighted synthesis filtered composite waveform from the perceptually weighted input waveform to form an output waveform;
- selector means for searching through the first plurality of codebooks and the adaptive codebook to minimize the errors in the output waveform; and
- decoder means for decoding the output waveform, the decoder comprising a second plurality of codebooks and at least one second adaptive codebook.

5. The system of claim 4, wherein the system further comprises masking means for masking a quantization noise from the output of the first plurality of codebooks.

6. The system of claim 4, further comprising of post-filtering means for filtering the decoded output waveform.

7. A method for encoding an audio signal, comprising the steps of:

generating a multiple band excitation codebook bank and at least one adaptive codebook;

coupling the multiple band fixed excitation codebook bank and the at least one adaptive codebook for generating a composite excitation signal.

providing a long-term and a short-term prediction signal;

classifying as voice or music the composite excitation signal based on the long-term prediction signal and the short-term prediction signal; and adapting the classified composite excitation signal to a statistical character of the audio signal.

* * * * *